H. S. BALDWIN.
ADJUSTABLE MOUNTING FOR AUTOMOBILE STARTING MOTORS AND GENERATORS.
APPLICATION FILED JUNE 30, 1915.
1,191,553.
Patented July 18, 1916.
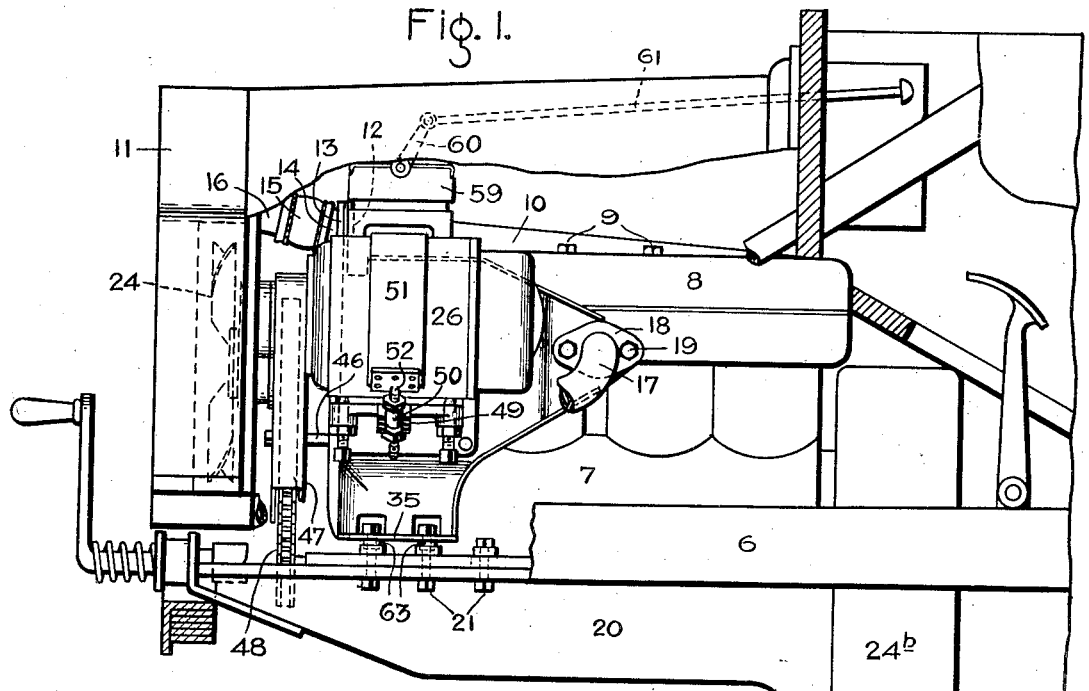
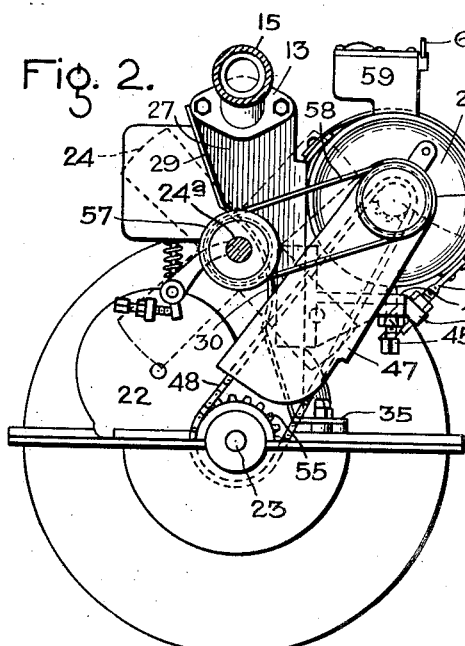
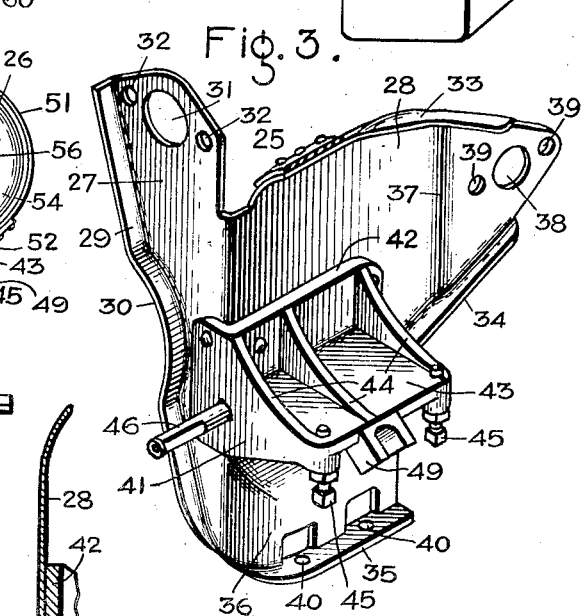
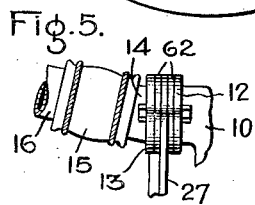
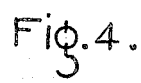
Inventor,
Henry S. Baldwin,
by
Att'y.

UNITED STATES PATENT OFFICE.

HENRY S. BALDWIN, OF LYNN, MASSACHUSETTS, ASSIGNOR TO GENERAL ELECTRIC COMPANY, A CORPORATION OF NEW YORK.

ADJUSTABLE MOUNTING FOR AUTOMOBILE STARTING-MOTORS AND GENERATORS.

1,191,553.   Specification of Letters Patent.   Patented July 18, 1916.

Application filed June 30, 1915. Serial No. 37,191.

*To all whom it may concern:*

Be it known that I, HENRY S. BALDWIN, a citizen of the United States, residing at Lynn, county of Essex, State of Massachusetts, have invented certain new and useful Improvements in Adjustable Mounting for Automobile Starting-Motors and Generators, of which the following is a specification.

At the present time there is an almost universal demand by owners and operators of automobiles for electric starting motors and lighting generators. This demand extends to those using old as well as new machines. One of the many problems presented in equipping an automobile, whether it be new or old, with a starting motor and electric generator, is to provide a suitable mounting or support for the same, and in particular to provide one which can be applied to the machine at a minimum cost for labor and in a relatively short time, and this without modification of any of its essential parts. Also the mounting should be of such character that the motor or generator can be adjusted toward and away from the main shaft to adjust the driving connection between the two, and also axially to bring the driving and the driven gears or sprockets into proper alinement. Further, the mounting or support must be composed of a few simple parts of a rugged nature so arranged that neither it nor the machine shall interfere with the accessibility of the parts of the engine, and the initial cost must be as low as possible consistent with the work to be performed.

The object of my invention is to provide a support or mounting for automobile starting motors or electric generators which will fulfil the exacting requirements above specified.

The accompanying drawing illustrates one of the embodiments of my invention.

Figure 1 is a view in side elevation of the front part of an automobile fitted with my improved apparatus; Fig. 2 is a front view of the same, the radiator being removed; Fig. 3 is a perspective view of a supporting bracket; Fig. 4 is a detailed sectional view of a part of the same; and Fig. 5 is a detail view illustrating the connection of the bracket to the cooling water pipes.

I shall describe my invention in connection with the Ford automobile since it has great utility in that connection, but it is to be understood that the apparatus is capable of wider application.

Referring to the drawing 6 indicates one of the side frame bars of the chassis upon which the internal combustion engine 7 is mounted in any suitable way. The engine shown is of the 4-cylinder type having a removable head 8 which is secured in place by bolts 9 in the ordinary manner.

10 indicates the conduit formed in the head through which cooling water from the cylinder jackets passes to the radiator 11. It terminates in a flange 12 to which is bolted a similar flange 13 carried by a short pipe section 14, see Fig. 5. The pipe section 14 is connected by a rubber hose 15 to a short pipe 16 leading to the radiator 11.

17 indicates a pipe which forms the other connection between the engine jackets and the radiator. This pipe is shown broken away in order to more clearly show the parts behind it. Its connection with the cooling jacket is by means of flanges similar to those shown in Fig. 5, the flange on the pipe 17 being indicated at 18 in Fig. 1 and the fastening bolts being shown at 19. Below the engine is a crank casing 20 which is secured to the engine proper by bolts 21, the plane of division being horizontal. In front of the engine is a commutator 22 driven indirectly from the main crank shaft 23, and a fan 24 shown in dotted lines, the latter being on the shaft $24^a$. In the rear of the engine is a casing $24^b$ containing the flywheel, clutch, change speed gearing, etc. All the parts thus far described are old and well known.

Referring now particularly to Fig. 3, 25 indicates a bracket which forms a support or mounting for the dynamo electric machine 26, in this case a motor, said bracket extending from a point in front of the engine to one side thereof where the motor is supported. The motor serves to start the engine into operation and after the latter is operating may serve as a generator to furnish current to charge the storage battery and also for lighting. The bracket is preferably of pressed steel and comprises a substantially flat and vertically extending member or portion 27, which is located slightly in advance of the front of the engine cylinders and a second vertically extending flat portion 28 which extends at right angles to the portion 27 and parallel to the side of the engine. The front portion 27 is provided with a stiffening flange 29 along one edge in order to strengthen it, and has a curved edge as indicated at 30 which passes around the shaft 24ª. It is also provided with an opening 31 which registers with pipe 14 through which the circulating water flows and with holes 32 through which fastening bolts extend, as will be described more fully hereinafter. The portion 28 is provided with stiffening flanges 33, 34 and 35, the flange 35 being in substance a continuation of flange 29. It also has a bulged or offset portion 36 which permits the bracket to conform closely to the contour of the engine. The portion of the member 28 as shown at the right in Fig. 3 is bent at a slight angle as indicated at 37 to make it conform to the engine contour and is provided with an opening 38 which registers with the pipe 17 and with holes 39 for fastening bolts. The bottom flange 35 has openings 40 for fastening bolts. Fixed to the bracket 25 is a supporting saddle 41 for the motor. This saddle comprises an angular back plate 42 which conforms with and is fastened to the portions or members 27 and 28 of the bracket and a horizontal outwardly extending portion 43, having three curved ribs 44 upon which the motor rests. 45 are adjusting screws for positioning the motor, and 46 is a rod which assists in supporting a guard 47 for a driving chain 48. 49 is a lug having a slot therein in which fits the body part of a nut 50 having flanges on its two ends. 51 is a metal strap which encircles the motor to clamp it on the bracket. On its free end it carries a bolt 52 which threads into nut 50. By turning the nut the strap may be tightened to hold the motor in place, as will be obvious. The chain 48 referred to above, connects the sprockt 54 on the motor shaft to the sprocket 55 on the engine shaft. The motor shaft is also provided with a pulley 56 which is connected to a pulley 57 on the fan shaft 24ª by a belt 58. For controlling the motor a switch box 59 having an operating arm 60 is mounted, preferably directly on top the motor. A rod 61 connects with arm 60 and extends through the dash of the car to within reach of the operator. This gives a very simple controlling arrangement and reduces the wiring necessary for installation to a minimum.

When the starting motor is installed the portion 27 of the bracket 25 fits against the front of the engine, its upper end being clamped between the water connection flanges 12 and 13 with opening 31 registering with the pipe opening. Gaskets 62 (Fig. 5) are provided between the flanges to insure a water tight connection. The bolt openings 32 register with those already in the flanges 12 and 13, so that the same bolts already used for fastening the water connections are used to clamp the bracket in place. The bolt openings 32 are preferably made slightly over size so as to compensate for any ordinary variation in either the engine structure or the bracket structure, and also for any relative expansion and contraction of the bracket and engine. Since the bracket is relatively thin the hose section 13 can be readily compressed slightly or slipped a little farther on to pipe 16 to provide the necessary space for the bracket and the gaskets. The connection of the portion 28 of the bracket to the other water connection is substantially the same as that just described and detailed description thereof is accordingly unnecessary. The lower flange 35 of the bracket rests on the crank case flange, the openings 40 registering with openings already provided in the crank case flange. To provide an even surface for the flange to rest on I preferably insert washers as indicated at 63 in the countersunk bolt seats upon which the flange rests. By the above arrangement I provide a three-point suspension for the bracket which insures that it is firmly anchored and perfectly rigid. At the same time all three points of suspension are on the engine itself which insures that the relation between the parts will be preserved at all times.

My improved arrangement has, as practical experience has demonstrated, the advantage that it can be readily applied to existing, as well as new, machines without modification of any of its essential parts. By using the same bolt spacing for the bracket as is used in the engine no additional holes have to be tapped or drilled and in many instances even the same bolts already employed may be used. This makes the installation of the bracket and motor a very simple affair.

To obtain the correct alinement of the parts, the motor is adjusted on the bracket. By loosening the strap 51 it can be slid axially and by turning the bolts 45 it can be raised or lowered. This arrangement whereby the motor is adjustable on the bracket has the advantage that after the bracket is once firmly anchored in position it need not again be disturbed as the motor can be adjusted thereon as desired to maintain the parts in alinement. It can also be readily removed and replaced should it be found necessary, without disturbing the bracket connection.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. The combination with an internal combustion engine, of a bracket secured thereto at three separate points forming a three-point suspension therefor, a dynamo electric machine carried by said bracket, said machine being adjustable both vertically and horizontally on said bracket, and a driving connection between said machine and the engine shaft.

2. The combination with an internal combustion engine, of a bracket having a portion which extends along the side of the engine, and a portion at an angle thereto which extends in front of the engine, means for attaching the first named portion at its top and bottom to the engine, means for attaching the other portion at one point to the engine, a support carried by the bracket, a dynamo electric machine adjustably mounted on said support, and a driving connection between said machine and the engine shaft.

3. The combination with an internal combustion engine having a flange on its lower part, and conduit means for conveying cooling fluid to and from the engine, of a bracket that is supported by said flange and also by each of said conduit means thereby forming a three-point suspension, a dynamo electric machine carried by the bracket, and a driving connection between said machine and the engine.

4. The combination with an internal combustion engine having a conduit for conveying cooling fluid thereto and a second conduit for conveying it therefrom, and means for attaching each of said conduits to the engine, of a bracket that is secured to the engine frame at one point and by said attaching means at two other points, a dynamo electric machine which is supported by the bracket, and a driving connection between the engine and said machine.

5. The combination with an internal combustion engine having a flange on its lower part, a flanged conduit for conveying cooling fluid to it, a flanged conduit for conveying cooling fluid therefrom, and bolts which pass through said flanges for attaching the conduits to the engine, of a bracket which is secured to the engine at two points by said flange attaching bolts, means for supporting said bracket at a third point on said engine flange, a dynamo electric machine carried by said bracket, and a driving connection between the engine shaft and the rotor of said machine.

6. The combination with an internal combustion engine having a flanged conduit at its front end and a flanged conduit on one side for conveying cooling fluid to and from the engine, and means for attaching said conduits to the engine, of a bracket located at the side of said engine and having an angular part which extends in front of the engine, said bracket and the angular part being fastened in place at two points by said attaching means for the conduits, means for attaching the bracket at its lower end to the engine frame, a dynamo electric machine carried by the bracket, and a driving connection between the engine shaft and the rotor or said machine.

7. In a device of the character described, a pressed steel bracket comprising a main portion adapted to lie along the side of an engine and having holes at its upper and lower ends to receive attaching bolts, a portion at an angle thereto adapted to lie along the front of an engine and having holes at its upper end to receive attaching bolts, and a support for a motor carried by said main portion.

8. In a device of the character described, a pressed steel bracket comprising a main portion adapted to lie along the side of an engine and having a flange on its lower edge with holes in said flange and in the upper end to receive retaining bolts, a portion at an angle thereto adapted to lie along the front of an engine and having holes for retaining bolts, and a stiffening flange along the edge of the last named portion.

9. The combination of an internal combustion engine with a pressed metal bracket comprising a main portion that extends along one side of the engine and a second portion forming a continuation thereof that extends along one end of the engine, means for attaching said main portion to the engine at two points and means for attaching the second portion of the engine at one point, a dynamo electric machine attached to the bracket and a driving connection between the shaft of the engine and that of said machine.

10. The combination of an internal combustion engine with a pressed metal bracket comprising a main portion that extends along one side of the engine and a second portion that forms a continuation thereof that extends along one end of the engine, means for attaching one end and the bottom of the main portion to the engine, means for attaching the upper end of the second portion to the engine, a dynamo electric machine mounted on the bracket, and a driving connection between the shafts of the engine and dynamo electric machine.

11. The combination with an internal combustion engine having flanged openings through which cooling fluid flows to and from it, and flanged pipes connected thereto, of a bracket supported at two points between said flanges and at a third point on the engine frame, a dynamo electric machine adjustably mounted on the bracket, and a driving connection between it and the engine shaft.

12. The combination with an internal combustion engine having a flanged opening at its front and a flanged opening at one side through which cooling fluid flows to and from the engine, and flanged pipes connected thereto, of a bracket having a portion which lies along the front of the engine and is fastened between said front flanges, and a portion which lies along the side of the engine and is fastened between said side flanges, said last named portion being also attached to a third point on the engine frame, a dynamo electric machine adjustably mounted on the bracket, and a driving connection between it and the engine shaft.

In witness whereof, I have hereunto set my hand this 28th day of June, 1915.

HENRY S. BALDWIN.